Nov. 9, 1937.  C. C. DE PEW  2,098,571
LINK TYPE DYNAMIC DAMPER
Filed Sept. 21, 1935
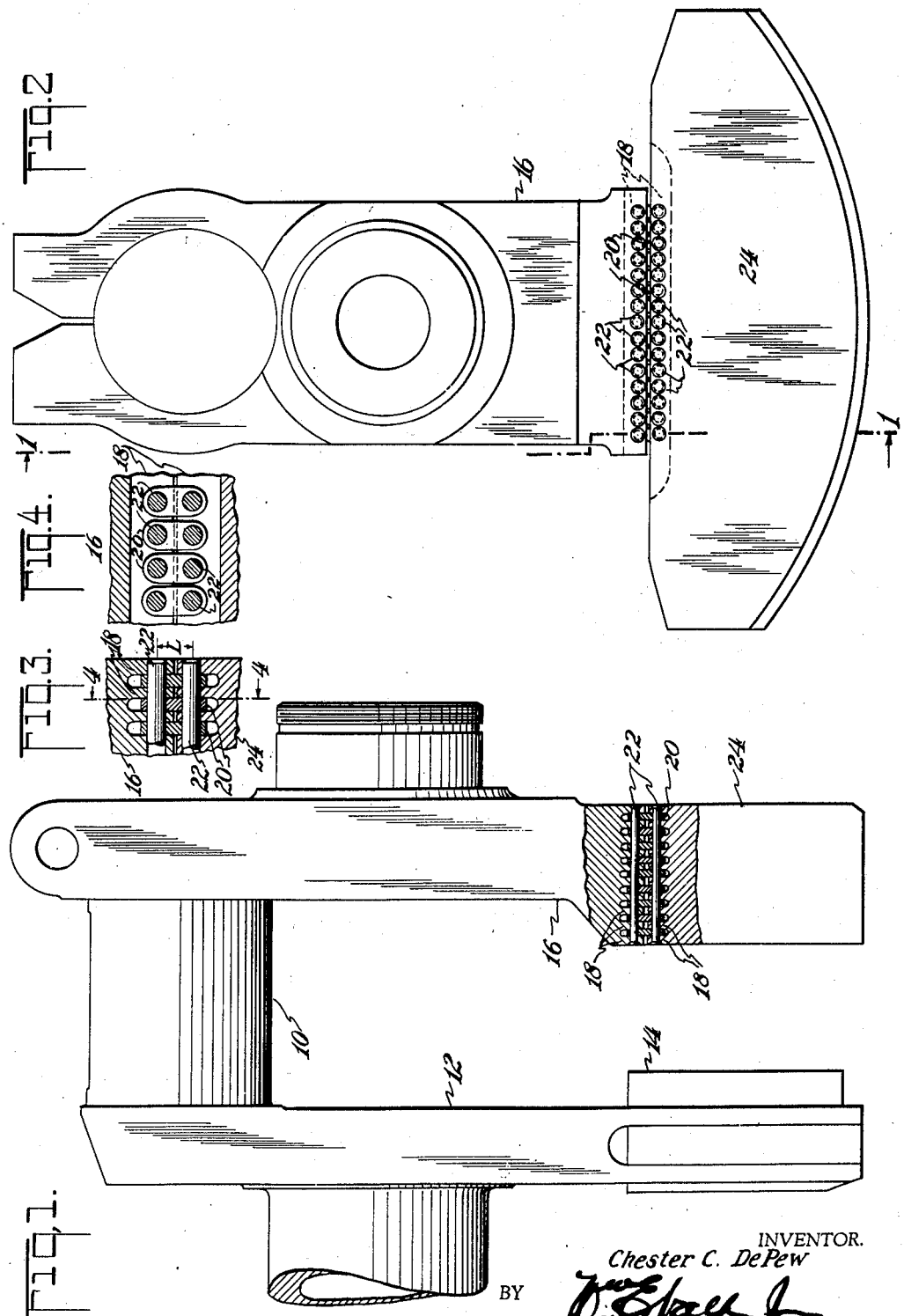
INVENTOR.
Chester C. DePew
BY
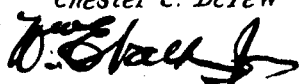
ATTORNEY.

Patented Nov. 9, 1937

2,098,571

UNITED STATES PATENT OFFICE 2,098,571

LINK TYPE DYNAMIC DAMPER

Chester C. De Pew, Bloomfield, N. J., assignor to Wright Aeronautical Corporation, a corporation of New York Application September 21, 1935, Serial No. 41,531

3 Claims. (Cl. 74—604)

This invention relates to synchronous pendulum torsional vibration balancers and in certain respects comprises improvements on the copending application of Chilton, Serial No. 7,475, filed February 21, 1935.

In that application there is shown a means for endowing a mass of large polar moment with a relatively high pendulum frequency comprising rollers loosely engaged within holes formed in a shaft extension and in the counterweight.

The present invention comprises an alternate structure for obtaining the same effect and the objects are in general similar to those set forth in the above identified application.

It is known that in the prior art, pendulous masses have been supported on one or two pendulum links, on a shaft. Though theoretically sound, such a construction presents practical difficulties, since the pendulum distance between the shaft and mass must be on the order of $\frac{1}{4}''$ to $\frac{3}{8}''$ on, for instance, a nine-cylinder engine. This would limit the diameter of the link pins to about $\frac{1}{8}''$ which obviously would be far too small to support the pendulum mass adequately.

Objects of this invention are to provide a link suspension for a pendulum counterweight wherein the above objections are overcome, the objectives being accomplished by utilizing a large number of links supported in the shaft and counterweight by multiple link pins each stressed in multiple shear. By this means, each pin and link is relatively small, causing less friction drag against free oscillation of the counterweight, and permitting of a more reasonable proportioning of the size and shape of links and pins, in consideration of the normally very short pendulum length that is desired.

In the drawing:

Fig. 1 is a side view in part section on the line 1—1 of Fig. 2;

Fig. 2 is an end view;

Fig. 3 is an enlarged fragmentary section through three of the links, also on the line 1—1 of Fig. 2; and Fig. 4 is a fragmentary section on the line 4—4 of Fig. 3.

In this drawing there is shown a crankshaft having a usual crankpin 10 and front crankcheek extension 12 to which is rigidly secured a conventional counterweight 14. A rear crankcheek 16 is provided with a large number of projections 18 defining a plurality of lateral grooves in each of which is disposed a plurality of short links 20 pivoted on cross pins 22, and a counterweight 24 is similarly constructed so as to be pendulously supported by the links 20. It is known that a mass so supported to a rotating shaft will have a constant pendulum frequency per shaft revolution regardless of the speed of shaft revolution and that, if this frequency be made synchronous to the torque impulses to which the shaft is subject, the pendulous mass will swing 180° out of phase to the impressed impulses which are thereby balanced to the suppression of torsional vibrations. However, the pendulum length required is relatively small and this length defines the length L in Fig. 3 of the links 20 which are therefore limited to relatively small diameter hinge pins 22 which would be inadequate to take the very high centrifugal loads of the weight 24 when only a single pair of links is used as in the prior art. Accordingly, the prime object of this invention is to utilize a great multiplicity of links, which is attained by arranging them in both lateral and longitudinal pluralities. In the example shown, each hinge pin engages nine links and there are fifteen hinge pins, in double shear at each link, so that the loads are divided over $9 \times 15 \times 2 = 270$ shear sections, whereby the shearing load on each pin is reduced to $$\frac{4}{270} = \frac{1}{67.5}$$

of the load present in the showings of the prior art where the conventional pair of links are used. It will be understood that if necessary, the link assemblage may be extended to subtend the entire lateral dimension of the counterweight, by widening the end of the crankcheek 16.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with crankshaft and counterweight members, each having an axially extended plurality of opposed laterally extended grooves, of a laterally extended plurality of links in each groove, and a lateral plurality of hinge pins spanning said grooves and engaging said links for the oscillating connection of said links to each member.

2. The combination with a crankshaft member and a counterweight member, of a plurality of ribs lying in planes of rotation, on each said member, said plurality exceeding two, said ribs having a plurality of bores axially parallel with the shaft, a plurality of links each engaging an inter-rib space of each member so that said links comprise rows in the plane of rotation and rows in the direction of the shaft axis, and shear pins engaging said rib bores and ends of said links, each said pin forming a pivot joint for all of the links of one row extending in the direction of the shaft axis, and, by virtue of the rib and link plurality, having a plurality of shear points throughout the pin length.

3. The combination with a crankshaft member and a counterweight member having opposed substantially flat faces in spaced relation, each said face having a plurality of axially spaced laterally extending grooves therein, providing thereby, ribs between the grooves, of an axial and lateral plurality of links fitting at their ends within the grooves of the respective members, and a lateral plurality of hinge pins engaging the ribs of each member, each pin traversing the axial pluralities of grooves and engaging the ends of the axial plurality of links engaged in respective grooves, each pin, by its engagement with a plurality of link ends and with a plurality of inter-groove ribs of said members, being placed in multiple shear in supporting the members relative to each other.

CHESTER C. DE PEW.